United States Patent [19]

Wilson

[11] Patent Number: 5,089,674
[45] Date of Patent: Feb. 18, 1992

[54] HYDROSTATIC PRESSURE SENSOR

[75] Inventor: Robert F. Wilson, Vancouver, Canada

[73] Assignee: Microtel Pacific Research Limited, Burnaby, Canada

[21] Appl. No.: 514,436

[22] Filed: Apr. 25, 1990

[51] Int. Cl.⁵ .............................. H01H 35/24
[52] U.S. Cl. ........................... 200/83 R; 200/83 A
[58] Field of Search ............... 200/83 A, 83 P, 83 R, 200/61.25, 83 J, 83 C

[56] References Cited

U.S. PATENT DOCUMENTS

| | | | |
|---|---|---|---|
| 2,360,848 | 10/1944 | Bryant | 114/367 |
| 2,824,315 | 2/1958 | McKenny | 114/367 |
| 2,839,767 | 6/1958 | Sieverts | 114/367 |
| 3,075,208 | 1/1963 | Mercer et al. | 114/367 |
| 3,711,222 | 1/1973 | Hartley | 200/83 J X |
| 4,350,854 | 9/1982 | Matsuda et al. | 200/83 P |
| 4,857,381 | 8/1989 | Suzuki | 174/117 F |
| 4,890,090 | 12/1989 | Ballyns | 340/442 |
| 4,900,883 | 2/1990 | Brame et al. | 200/83 J X |

FOREIGN PATENT DOCUMENTS

| | | |
|---|---|---|
| 198805 | 10/1986 | European Pat. Off. . |
| 1245787 | 7/1967 | Fed. Rep. of Germany . |
| 2208260 | 8/1973 | Fed. Rep. of Germany . |
| 2530168 | 1/1977 | Fed. Rep. of Germany . |
| 61-16189 | 1/1986 | Japan . |
| 61-16191 | 1/1986 | Japan . |

Primary Examiner—J. R. Scott
Attorney, Agent, or Firm—Shlesinger, Arkwright & Garvey

[57] ABSTRACT

A hydrostatic pressure sensor, one use for which is to initiate the automatic deployment of emergency marine safety equipment, when a specified depth below the water level is exceeded. The sensor uses a novel method of compensating for ambient air temperature and barometric pressure as a means of reducing the errors in depth sensing caused by changes in the above ambient conditions.

21 Claims, 3 Drawing Sheets

HYDROSTATIC PRESSURE SENSOR

BACKGROUND OF THE INVENTION

A common requirement for emergency marine safety equipment, such as life rafts and locator transmitters, is that it be released automatically if the vessel upon which it is carried should sink. Usually initiation of the release is designed to occur when a pre-determined depth (for example 4 meters) is exceeded.

Hydrostatic release mechanisms, which are commonly used to trigger the release of the safety equipment, react to the pressure increase that results when submersion to a specified depth occurs. The above release mechanism is itself actuated by the action of a hydrostatic pressure sensor. One such sensor uses an enclosed, air-filled chamber which has as one end a moveable diaphragm loaded by a compression spring from within. When submerged to a sufficient depth, the hydrostatic pressure against the outside of the diaphragm overcomes the combination of atmospheric pressure and spring force from the inside, and the diaphragm starts to move inward. The inward movement of the diaphragm can be used to initiate the release of the emergency equipment.

The foregoing method has the problem of serious triggering inaccuracy due to its not being independent of ambient air temperature or barometric pressure. This dependence occurs because the volume of air trapped within the chamber obeys normal gas laws and undergoes changes in absolute pressure in proportion to the absolute temperature, adding or subtracting to the force of the spring inside the chamber. In the case of changes in barometric pressure, an additional net force is also produced which adds or subtracts to the spring force (depending on whether the barometric pressure increases or decreases). Of the two mentioned sources of error, that of temperature dependence is by far the most serious, when such a device is expected to perform over the full environmental temperature range.

A known method of overcoming the above temperature related inaccuracy is the use of an aneroid as a pressure sensing device. This may take the form of a metal bellows, evacuated, and with an internal spring dimensioned to overcome the force due to atmospheric pressure and to provide an additional force equal to the force due to the hydrostatic pressure at the depth where triggering is desired. Since there is no gas within the aneroid, temperature dependency is eliminated, although the lesser dependence on barometric pressure remains. Although this method overcomes the difficulty of temperature dependence, a further problem arises due to the fact that absolute pressure is being measured, not the increase in pressure over atmospheric pressure. The hydrostatic pressure sensor must therefore be set to trigger at a pressure equal to the sum of the hydrostatic pressure at the desired release depth and atmospheric pressure, instead of the hydrostatic pressure alone. Since the trigger points desired are usually less than the equivalent of 5 meters of water head, the accuracy of the triggering point is much reduced since the hydrostatic pressure is only a small fraction of the total pressure being measured.

A known means of overcoming the sensing errors due to ambient air temperature and barometric pressure changes when using an air filled chamber with a moveable spring loaded diaphragm as the sensing device is to provide a small orifice into the chamber or to mount a small section of porous material over an opening into the chamber. The material acts as an orifice which provides greatly restricted air flow from inside to outside the chamber. By this means, air pressure inside the chamber will always reach an equilibrium with that outside, as slow changes in temperature and barometric pressure occur. Because of the small size of the orifice or the limited porosity of the porous material, if the latter is used, the chamber will respond to rapid changes in pressure such as reasonably quick immersion to a required triggering depth in water, providing that the application of this pressure occurs much faster than the orifice will allow equilibrium to occur. A significant disadvantage of this method is that the pressure sensing chamber is no longer completely sealed against the entry of liquid water. This causes two problems. First, the depth trigger point is affected if slow rates of immersion occur caused, for example, when slow submersion occurs due to water entry into the pressure chamber. Second, water entry into the pressure chamber may occur when the device is stored for long periods and exposed to rain and water spray in its normal shipboard mounting position. Such water entry interferes with operation of the device.

Accordingly, it is an object of the invention to provide an improved liquid pressure sensor. It is yet a further object of the invention to provide a hydrostatic pressure sensor which accurately compensates for changes in ambient temperature and barometric pressure.

SUMMARY OF THE INVENTION

According to the invention there is provided a hydrostatic pressure sensor which includes a housing having a chamber and an opening at one end, a diaphragm covering the opening in sealing contact with the housing and biasing means for biasing the diaphragm outwardly of the chamber. Means for affixing the diaphragm to the housing so as to cover the opening to the chamber while at the same time permitting fluid communication between an exterior surface of the diaphragm and a region exterior to the sensor. In this way little or no gas is trapped inside the end cap upon immersion. Further included are release actuator means for initiating the release of a removable element state in response to movement inwardly of the chamber of the diaphragm beyond a predetermined position. Porous means is coupled to the housing for permitting passage of gas but blocking passage of liquid into the chamber. Thus, the gas pressure inside chamber tracks the ambient gas pressure when the sensor is not immersed in fluid such as water. However, once immersed in liquid, a sealed pressure chamber results with the gas permeable means blocking entry of liquid into the chamber at the depths involved which are typically less than about 5 meters.

Preferably the liquid is water. The gas permeable means may be a sheet material porous to gas but substantially impermeable to water and affixed to the housing in sealing contact therewith over an opening to the chamber. Advantageously, the gas is air. The diaphragm itself may function as the gas porous means if it is made of a flexible hydrophobic material such as a type of expanded polytetrafluoroethylene.

A retaining means for locking an external element to the sensor and responsive to a change in state of the switch means may be used to unlock the external element. The external element may be an item of emergency equipment such as an emergency locator radio beacon.

The end cap may have orthogonally intersecting first and second bores and the retaining means may be a member slidably insertable into the first bore with the trigger means being a pin coupled to said diaphragm and slidable in the second bore through a hole in said retaining member so as to lock the latter against movement out of the first bore and away from said sensor.

Alternatively, the switch means may be an electrical switch and the retaining means an electro-mechanical locking device.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows read in conjunction with the accompanying drawings, wherein:

DETAILED DESCRIPTION WITH REFERENCE TO THE DRAWINGS

Figure 1:
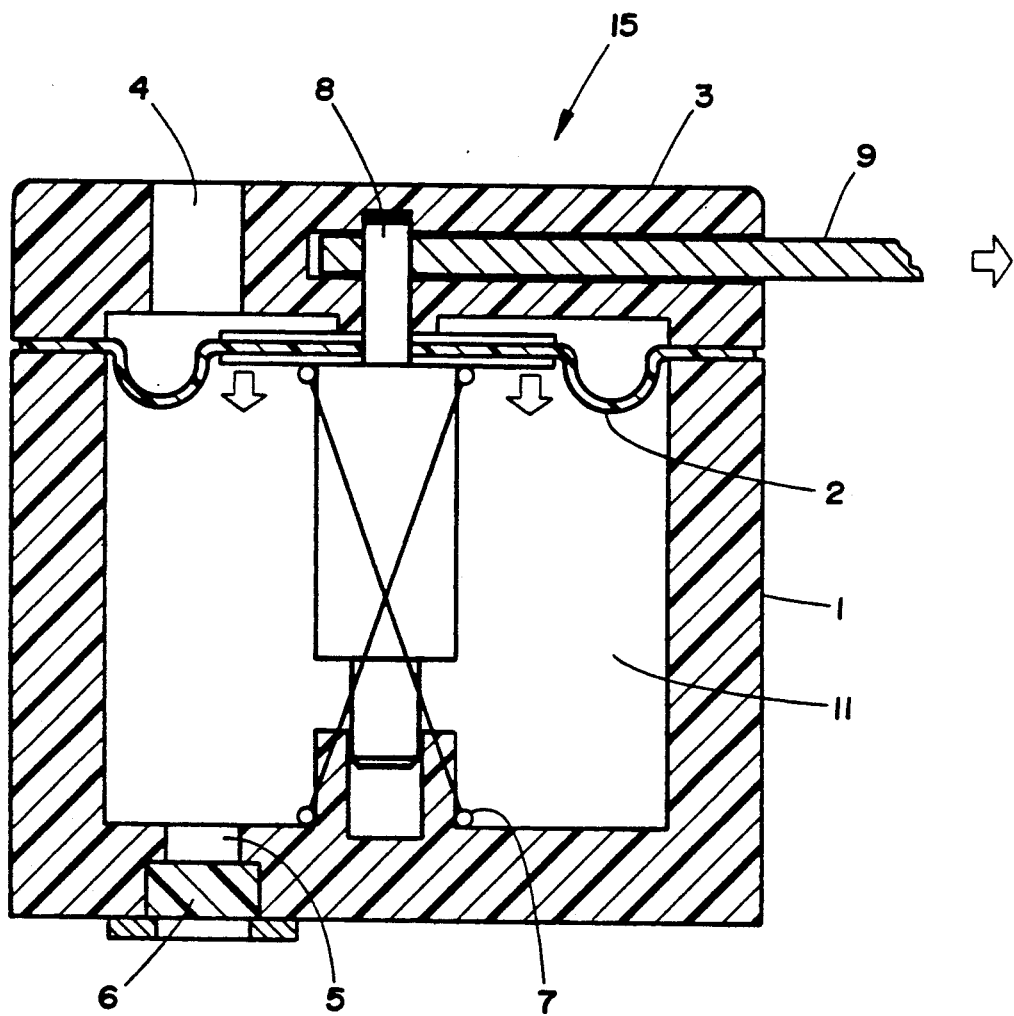
FIG. 1 is a sectional elevation view of a sensor according to a preferred embodiment of the invention in which a hydrophobic element is in place in an aperture in the wall of the housing.

Referring to FIG. 1, a hydrostatic pressure sensor 15 according to the invention consists of a cylindrical pressure sensing housing 1 which is opened at one end, closed at the other end and encloses a chamber 11. An impermeable flexible diaphragm 2 is fitted to the open end of the chamber and held in position by a rigid end cover 3. The end cover 3 is pierced by a suitable number of openings 4 so that air or water can circulate freely to the underside of the cover 3. Openings 4 ensure that there is no possibility of any significant amount of air being trapped between the diaphragm 2 and the end cover 3 upon immersion of the assembly. Through housing 1 there is formed a hole 5 leading to chamber 11. Hole 5 is covered with a hydrophobic material 6 porous to gas, a specific example of which is a type of expanded polytetrafluoroethylene such as a product sold under the trademark "Gortex" and manufactured by the W. L. Gore & Associates, Inc. Although material 6 will allow the passage of air into and out of the pressure chamber 11, liquid water at low pressure will be blocked from entering the chamber 11 by the hydrophobic nature of the material 6 covering the hole 5 inside the pressure chamber 11. A compression spring 7 is installed in chamber 11 which acts against the moveable diaphragm 2.

A release pin 8 is attached to the outside of the diaphragm 2 and initially passes through a hole in a sliding bar 9 so as to retain the latter within end cover or end cap 3. Bar 9 is attached in a suitable way to equipment to be set free (not shown).

Because of the presence of the above mentioned hole 5 covered by the hydrophobic material 6 porous to gas, the pressure inside the pressure chamber 11 is always able to reach equilibrium with the changing ambient air pressure. In the presence of air, therefore, the housing 1 is not sealed, and acts similar to a known arrangement of a pressure sensing chamber with a small orifice, or a section of porous material, included in the wall of a chamber. Once immersed in water, however, the hydrophobic nature of the material 6 causes the entry of water into the chamber 11 to be blocked since water cannot pass through this material. Therefore, when the sensor 15 is immersed in water, its pressure chamber 11 no longer acts in a similar way to a chamber with a small orifice, or to a chamber with a section of porous material in its wall. It now acts as a completely sealed pressure chamber. It should be realized that the intended hole covering material 6 will only block the passage of water at relatively low pressures; increasing water pressure will eventually overcome the hydrophobic properties of the material, and water will begin to pass through. In this application, the onset of this effect is of no concern, since it occurs only at a depth considerably greater than the typically required release depth which does not usually exceed 5 meters.

The form of the invention shown in FIG. 1 operates as follows. Typically, the hydrostatic pressure sensor 15 would be installed together with the emergency equipment (not shown) to be released in such a way that the emergency equipment is secured to the sliding bar 9. Since bar 9 is initially retained by the release pin 8, the emergency equipment is held firmly, and its release is prevented. Both the pressure sensor 15 and the emergency equipment would normally be mounted together on an external surface of a ship (not shown) where there would be free access to the water if the ship should begin to sink. Prior to an emergency, the pressure chamber 11 of the pressure sensor 15 is not immersed in water, and therefore since air can freely permeate the chamber hole 5 through the hydrophobic covering material 6, the pressure inside the chamber 11 always follows the normal changes in ambient air pressure as previously explained. In the event of the ship sinking, emergency equipment (not shown) together with the sensor 15 and associated release mechanism is immersed in water and begins to go down with the ship (not shown). At the moment of entry into the water, the pressure inside the pressure chamber 11 exactly equals the ambient air pressure, thus setting the reference pressure within the chamber 11 against which the water pressure on the other side of the diaphragm 2 will be compared.

Once immersed, water floods the space above the diaphragm 2 via the holes 4, the chamber 11 then becomes effectively sealed due to the above mentioned properties of the hole covering material 6, and the water pressure exerts a force on the diaphragm 2 equal to the water pressure at the depth of immersion multiplied by the effective area of the diaphragm 2. Since water cannot leak into the chamber 11 and cause the internal volume to slowly decrease, as would be the case if a small orifice or section of porous material were placed in the chamber wall as a means of compensating for ambient air pressure changes, the force exerted on the diaphragm 2 depends only on the depth of immersion and is not time dependent in the sense that there is a time dependent force developed from water leaking into chamber 11 which offsets the force on the diaphragm due to the pressure of water outside of the chamber.

As the pressure sensor 15 sinks further below water level, the hydrostatic pressure and therefore the force on the diaphragm 2 increases. When the force on the diaphragm 2 increases to the point where it equals the force due to the opposing spring 7, any further increase in depth causes the diaphragm 2, and therefore the release pin 8, to move inward and release the sliding bar 9. The emergency equipment (not shown) is now free to float to the surface.

Figure 2:
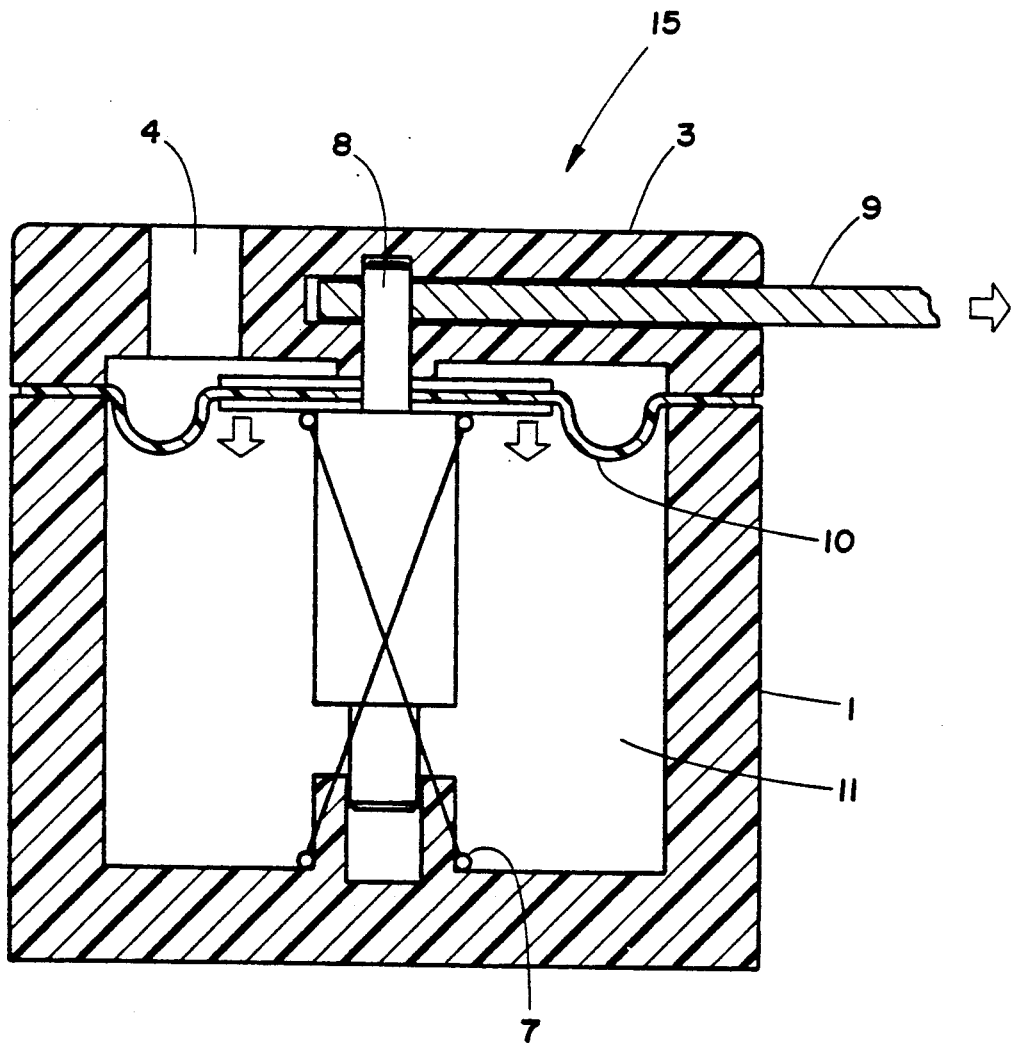
FIG. 2 is a sectional elevation view as in FIG. 1 of a variant of the sensor in which the flexible diaphragm itself constitutes the hydrophobic element.

A second form of the invention shown in FIG. 2 is similar to that shown in FIG. 1, but combines the functions of the diaphragm 2 and the hydrophobic material 6 porous to air covering hole 5. Here, a flexible version of this material 10 in sheet form is used to make the diaphragm 10 itself. The advantages of this form of the invention over the first form are greater simplicity, lower cost, elimination of possible sealing problems around the hole 5 shown in FIG. 1, and better protection of the hydrophobic material from damage.

Figure 3:
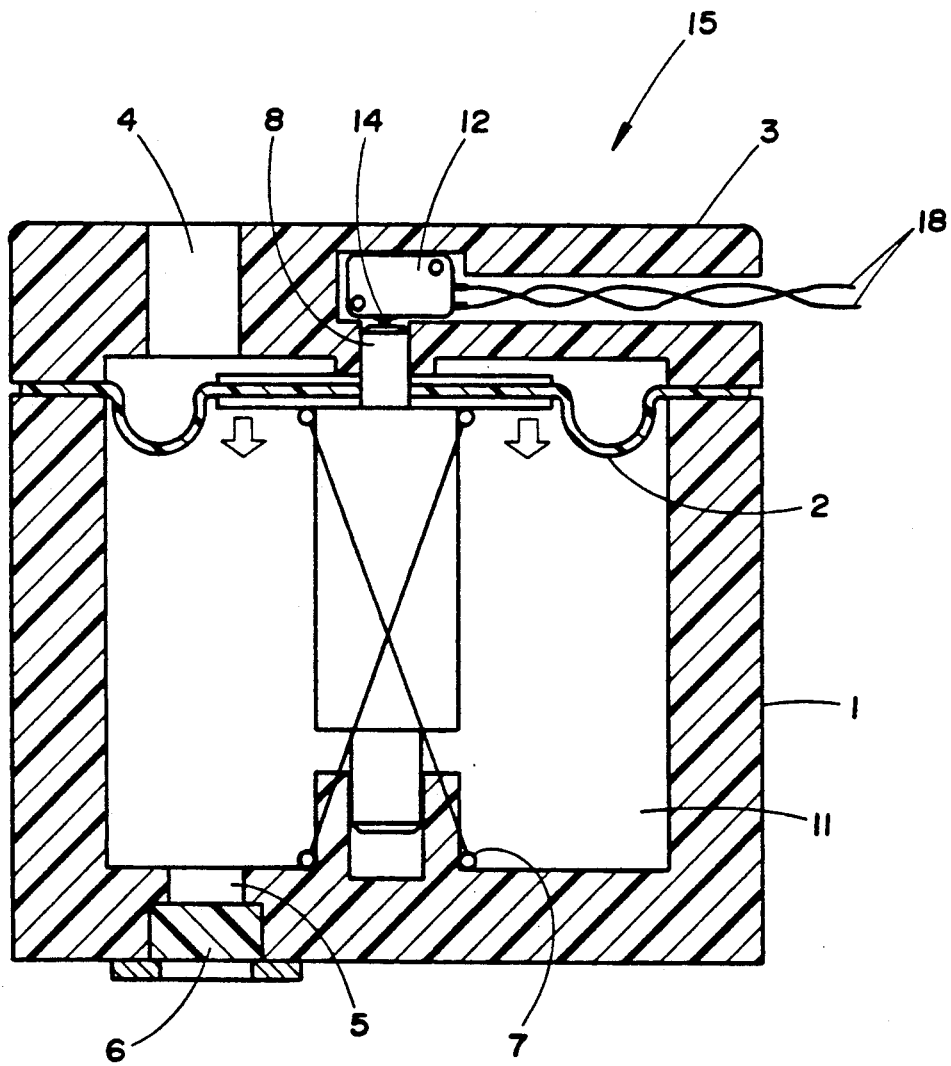
FIG. 3 is a sectional elevation view of the embodiment of the sensor of FIG. 1 in which an electrical switch is incorporated into the end cap.

In a third variant of the invention shown in FIG. 3 there is shown mounted in the end cover 3 an electrical switch 12 with a plunger actuator 14 and two electrical leads 16 leading from the switch 12 through the end cover 3 to an external electromechanical release mechanism such as a solenoid (not shown). Plunger 14 is engaged by pin 8 which, on submersion of the sensor 15 gradually releases plunger 14 until a switching threshold is reached. However, a non-electrical system is preferred particularly for salt water operation.

Obviously, other forms of release mechanisms could be envisaged such as piezo-electric transducer coupled to the diaphragm or a spring loaded lever journalled at its center to the end cover 3 with one end engaging pin 8 and the other end a recess in a release latch.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore comtemplated that the appended claims will cover any such modifications or embodiments as fall with the true scope of the invention.

I claim:

1. A hydrostatic pressure sensor, comprising:
   (a) a housing having a chamber and an opening at one end;
   (b) a movable element covering the opening in sealing contact with said housing;
   (c) actuator means for initiating action on an external element in response to movement inwardly of the chamber of said moveable element beyond a predetermined position; and
   (d) porous means for permitting passage of gas into and out of the chamber but blocking the passage of water into the chamber so as to allow equalization of pressure in the chamber with the surrounding atmosphere substantially instantaneously, said porous means being formed from expanded polytetrafluoroethylene.

2. A sensor according to claim 1, wherein the chamber has a gas pressure equalizing opening and said porous means is a material porous to ga but substantially impermeable to water and affixed to said housing in sealing contact therewith over the gas pressure equalizing opening to the chamber.

3. A sensor according to claim 1, wherein said movable element is a diaphragm.

4. A sensor according to claim 3, including means for affixing said diaphragm to said housing so as to cover the opening to the chamber while at the same time permitting fluid communication between an exterior surface of said diaphragm and a region exterior to said sensor.

5. A hydrostatic pressure sensor, comprising:
   (a) a housing having a chamber and an opening at one end;
   (b) a diaphragm covering the opening in sealing contact with said housing, at least a portion of said diaphragm being porous to gas but substantially impermeable to the passage of water therethrough such that the pressure in the chamber is equalized to atmospheric pressure substantially instantaneously when in a gaseous atmosphere;
   (c) means for affixing said diaphragm to said housing so as to cover the opening to the chamber while at the same time permitting fluid communication between an exterior surface of said diaphragm and a region exterior to said sensor; and
   (d) actuator means for initiating action on an external element in response to movement inwardly of the chamber of said diaphragm beyond a predetermined position.

6. A sensor according to claim 3 or 5, wherein said actuator means includes a pin slidable in a pin bore in said housing in response to movement of said diaphragm, said pin releasably engaging a removable element slidably retained within an element bore in said housing, an axis of said pin bore being at a substantial acute or right angle to an axis of said element bore, and said pin disengaging from said element in response to movement of said pin beyond a predetermined distance along the pin bore.

7. A sensor according to claim 3 or 5, including biasing means for biasing said diaphragm outwardly of the chamber.

8. A sensor according to claim 3 or 5, wherein said actuator means includes an electrical switch coupled to said diaphragm operative to close in response to movement of said diaphragm inwardly by a predetermined amount.

9. A sensor according to claim 5, wherein said affixing means is an end cap over said diaphragm and affixed to said housing having a plurality of openings for permitting the passage of gas and water into contact with an outer surface of said diaphragm and said end cap has orthogonally intersecting pin and removable element insertable into the pin and removable elements bores, said pin being movable in response to movement of said actuator and disengaging from said removable element with movement of said diaphragm beyond a predetermined amount inwardly of said chamber.

10. A sensor according to claim 3 or 5, wherein said actuator means is an electrical switch and a piston located in the chamber, coupled to said diaphragm and slidably coupled to said chamber so that as said diaphragm moves said piston moves relative to said housing and operates said electrical switch.

11. A hydrostatic pressure sensor, comprising:
   (a) a housing having a chamber with a diaphragm opening providing fluid communication between said chamber and a region exterior to said housing and a pressure equalizing opening;
   (b) a diaphragm affixed to said housing over said opening so as to seal the chamber from the region external thereto;
   (c) biasing means coupled to said diaphragm for urging the latter outwardly of the chamber;

(d) a cap affixable to said housing over said diaphragm and such that a side of said diaphragm exterior to said chamber is in fluid communication with a region external to said housing;

(e) release actuator means for initiating the release of a removable element in response to movement inwardly of the chamber of said diaphragm beyond a predetermined position; and (f) a hydrophobic covering material covering the pressure equalized opening for permitting passage of gas but blocking passage of water into and out of the chamber such as to allow equalization of the pressure in the chamber with atmospheric pressure substantially instantaneously when in a gaseous atmosphere, said hydrophobic covering material being formed from expanded polytetrafluoroethylene.

12. A sensor according to claim 3, wherein said diaphragm is expanded polytetrafluoroethylene.

13. A sensor according to claim 11, wherein said gas is air.

14. A sensor according to claim 11, wherein said diaphragm is made of said hydrophobic covering material and the pressure equalizing opening is the diaphragm opening.

15. A sensor according to claim 11, wherein said biasing means is a spring mounted in said chamber against said diaphragm.

16. A sensor according to claim 11, including removable means for connection to an external element so as to restrain movement of the latter away from said sensor.

17. A sensor according to claim 11, wherein said cap has an orthogonally intersecting pin bore and removable means bore and a removable means slidably insertable into the removable means bore and a pin coupled to said diaphragm and slidable in the pin bore and through a hole in said removable means so as to lock the latter against movement out of the removable means bore and away from said sensor.

18. A sensor according to claim 11, wherein said removable means is a switch having an actuator coupled to said diaphragm and responsive to movement of said diaphragm inwardly beyond a predetermined position to change from a closed to an open or open to a closed state.

19. a sensor according to claim 18, including electrical wires coupled to said switch and connectable to an external electromechanical locking device for unlocking said device in response to said switch changing states.

20. A method of allowing gas pressure equalization in a chamber with the surrounding atmosphere but blocking the flow of water into the chamber, comprising:

(a) forming an opening into the chamber sufficiently large so that pressure equalization of the chamber with the surrounding atmosphere occurs substantially instantaneously in a gaseous atmosphere; and (b) covering the opening with a hydrophobic material formed from expanded polytetrafluoroethylene that completely blocks the flow of water therethrough but is porous to gas.

21. A sensor according to claim 11, wherein said housing and end cover are cylindrical.

* * * * *